United States Patent
Li et al.

(10) Patent No.: US 9,906,495 B2
(45) Date of Patent: *Feb. 27, 2018

(54) NETWORK DEVICE IMPLEMENTING TWO-STAGE FLOW INFORMATION AGGREGATION

(71) Applicant: Palo Alto Networks, Inc., Santa Clara, CA (US)

(72) Inventors: Sidong Li, Saratoga, CA (US); William A. Roberson, Scotts Valley, CA (US); Savitha Raghunath, Cupertino, CA (US); Subramani Ganesh, Sunnyvale, CA (US); Gyanesh Saharia, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,155

(22) Filed: Nov. 18, 2016

(65) Prior Publication Data

US 2017/0142066 A1 May 18, 2017

Related U.S. Application Data

(63) Continuation of application No. 14/447,388, filed on Jul. 30, 2014, now Pat. No. 9,531,672.

(51) Int. Cl.
*H04L 29/06* (2006.01)
*H04L 12/801* (2013.01)

(52) U.S. Cl.
CPC .......... *H04L 63/0227* (2013.01); *H04L 47/10* (2013.01); *H04L 63/02* (2013.01);

(Continued)

(58) Field of Classification Search
CPC ............. H04L 63/0227; H04L 63/0236; H04L 63/0263

See application file for complete search history.

(56) References Cited

U.S. PATENT DOCUMENTS 7,643,418 B1 * 1/2010 Varier ..................... H04L 47/10
370/229
8,005,012 B1 * 8/2011 Aybay ..................... H04L 43/02
370/232

(Continued)

OTHER PUBLICATIONS

Tsai, Chun-Hui; Chu, Hung-Mao; Wang, Pi-Chung; "Packet Classification Using Multi-Iteration RFC", 37th Annual Computer Software and Applications Conference Workshops, IEEE, Jul. 22-26, 2013, 6 pages.*

(Continued)

*Primary Examiner* — Victor Lesniewski
(74) *Attorney, Agent, or Firm* — Van Pelt, Yi & James LLP

(57) ABSTRACT

A network security device includes a network flow statistics processing engine to process network flow information related to network flows. The network flow statistics processing engine includes a first processing stage performing per-flow information aggregation and a second processing stage performing per-destination system component information aggregation, with each processing stage implementing a threshold-based data export scheme and a timer-based data export scheme. In this manner, up-to-date flow information is available to peer system components regardless of the varying flow rates of the network flow.

23 Claims, 6 Drawing Sheets

(52) U.S. Cl.
CPC ...... *H04L 63/0236* (2013.01); *H04L 63/0263* (2013.01); *H04L 2463/121* (2013.01)

(56) References Cited

U.S. PATENT DOCUMENTS

| | | | | |
|---|---|---|---|---|
| 8,520,522 | B1* | 8/2013 | Goldman | H04L 47/26 370/235 |
| 8,606,911 | B2* | 12/2013 | Raleigh | H04L 12/14 707/694 |
| 9,531,672 | B1* | 12/2016 | Li | H04L 63/02 |
| 2006/0034310 | A1* | 2/2006 | Connor | H04L 49/9063 370/419 |
| 2006/0067349 | A1* | 3/2006 | Ronciak | H04L 47/125 370/412 |
| 2007/0088845 | A1* | 4/2007 | Memon | H04L 47/10 709/234 |
| 2008/0219162 | A1* | 9/2008 | Akyol | H04L 47/10 370/232 |
| 2008/0291915 | A1* | 11/2008 | Foschiano | H04L 63/1441 370/392 |
| 2009/0116398 | A1* | 5/2009 | Shi | H04L 47/10 370/252 |
| 2010/0095367 | A1* | 4/2010 | Narayanaswamy | H04L 63/0245 726/12 |
| 2010/0188976 | A1* | 7/2010 | Rahman | H04L 47/10 370/235 |
| 2010/0284300 | A1* | 11/2010 | Deshpande | H04L 43/026 370/253 |
| 2010/0329118 | A1* | 12/2010 | Adams | H04L 47/10 370/235 |
| 2011/0138455 | A1* | 6/2011 | Waskiewicz | H04L 63/0263 726/11 |
| 2011/0242979 | A1* | 10/2011 | Feroz | H04L 47/17 370/235 |
| 2011/0296002 | A1* | 12/2011 | Caram | H04L 43/18 709/224 |
| 2012/0207175 | A1* | 8/2012 | Raman | H04L 47/125 370/412 |
| 2012/0311132 | A1* | 12/2012 | Tychon | H04L 41/5038 709/224 |
| 2013/0010600 | A1* | 1/2013 | Jocha | H04L 43/026 370/236.2 |
| 2013/0205037 | A1* | 8/2013 | Biswas | H04L 47/365 709/232 |
| 2013/0291088 | A1* | 10/2013 | Shieh | H04L 63/0218 726/11 |
| 2014/0112187 | A1* | 4/2014 | Kang | H04L 43/024 370/253 |
| 2014/0126367 | A1* | 5/2014 | Stark | H04L 43/0852 370/235 |
| 2014/0215561 | A1* | 7/2014 | Roberson | H04L 63/08 726/3 |
| 2014/0259146 | A1* | 9/2014 | Zuk | H04L 63/02 726/13 |
| 2014/0269690 | A1* | 9/2014 | Tu | H04L 47/10 370/389 |
| 2014/0304802 | A1* | 10/2014 | Pope | H04L 63/0245 726/13 |
| 2014/0317684 | A1* | 10/2014 | Porras | H04L 63/20 726/1 |
| 2014/0334302 | A1* | 11/2014 | Loach | H04L 47/32 370/235 |
| 2015/0074258 | A1* | 3/2015 | Ferreira | H04L 43/0876 709/224 |
| 2015/0163144 | A1* | 6/2015 | Koponen | H04L 47/125 370/237 |
| 2015/0213075 | A1* | 7/2015 | Collinge | H04L 63/0236 709/213 |
| 2015/0281085 | A1* | 10/2015 | Phaal | H04L 47/12 370/235 |
| 2015/0324306 | A1* | 11/2015 | Chudgar | G06F 13/385 710/308 |
| 2016/0028630 | A1* | 1/2016 | Wells | H04L 45/7453 370/389 |

OTHER PUBLICATIONS

Zhenqi, Wang; Xinyu, Wang; "NetFlow Based Intrusion Detection System", International Conference on MultiMedia and Information Technology, Dec. 30-31, 2008, 4 pages.*

* cited by examiner

NETWORK DEVICE IMPLEMENTING TWO-STAGE FLOW INFORMATION AGGREGATION

CROSS-REFERENCE TO OTHER APPLICATIONS

This application is a continuation of U.S. patent application Ser. No. 14/447,388, entitled NETWORK DEVICE IMPLEMENTING TWO-STAGE FLOW INFORMATION AGGREGATION, filed Jul. 30, 2014, now U.S. Pat. No. 9,531,672, issued Dec. 27, 2016 which is incorporated herein by reference for all purposes.

BACKGROUND OF THE INVENTION

Devices such as firewalls are sometimes used to prevent users from accessing resources to which they are not authorized. As an example, members of the public may be entitled to access content served by a web server, but not authorized to access other services available on the server such as administrative tools. In another example, employees of a company may be entitled to access certain websites or certain classes of websites while other websites or other classes of websites may be prohibited for all employees. Firewalls and other security devices typically enforce policies against network transmissions based on a set of rules.

Traditional security devices are implemented as a monolithic device provided with multiple processors for handling the incoming data streams. Such security devices often implement a centralized control scheme where one processor is designated as the management processor. Incoming data packets are often broadcast to all processors in the security device and the processors cooperate with each other, through software messaging, to determine which processor should take ownership of handling incoming data packets belonging to one or more flows. However, the centralized control scheme is not scalable to handle an increased number of data packets. In some cases, a security device may be implemented as a distributed system.

Furthermore, to implement complex security policies, a firewall needs to keep track of many independent and random events and correlate the events for policy enforcement. Firewalls or other security devices typically maintain event statistics using counters which need to be updated rapidly to effectively examine network traffic as the traffic is being communicated. Maintaining event statistics becomes challenging when the security device is implemented as a distributed system.

BRIEF DESCRIPTION OF THE DRAWINGS

Various embodiments of the invention are disclosed in the following detailed description and the accompanying drawings.

DETAILED DESCRIPTION

Figure 1:
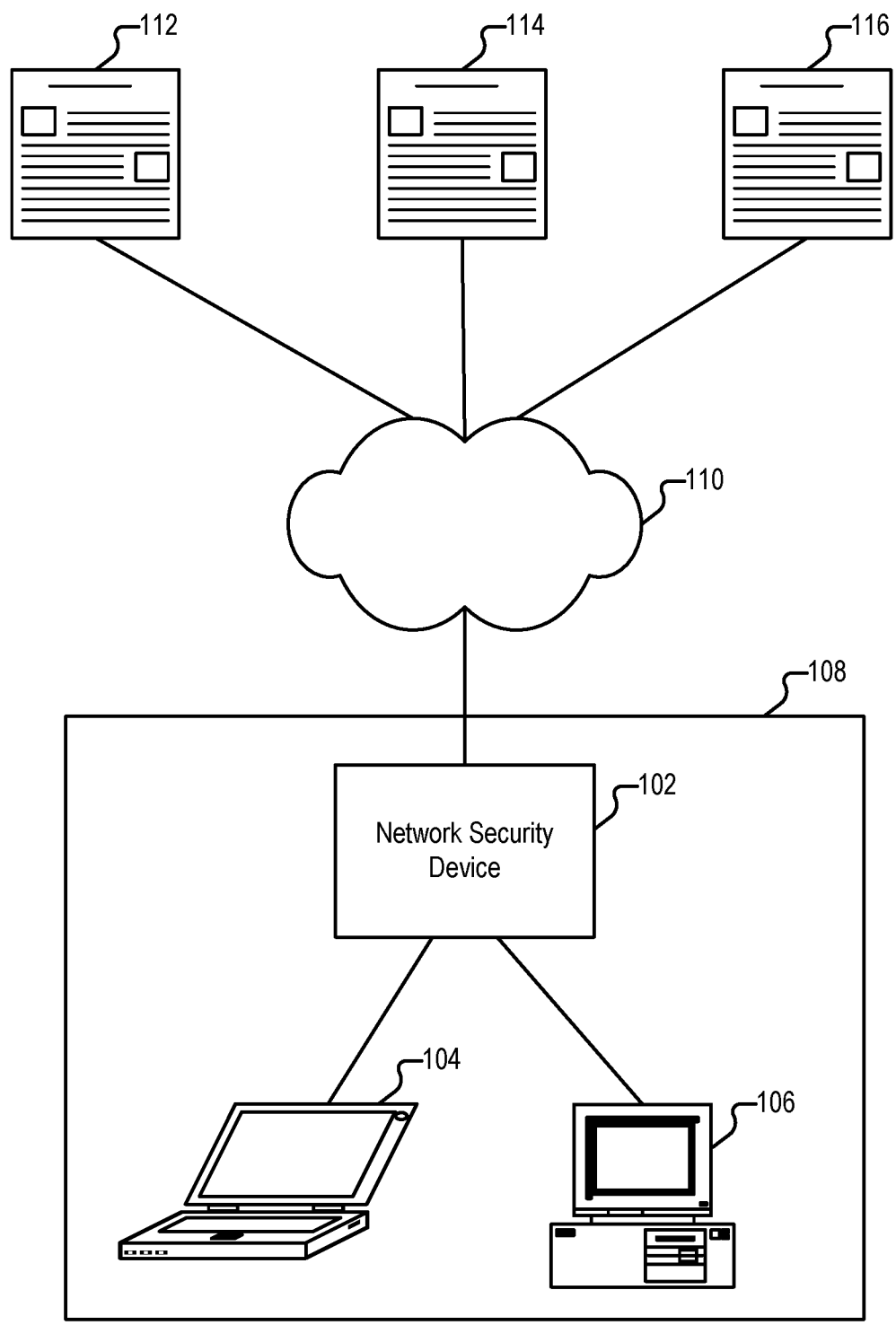
FIG. 1 illustrates an embodiment of an environment in which security policies are enforced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a network security device includes a network flow statistics processing engine to process network flow information related to network flows. The network flow statistics processing engine includes a first processing stage performing per-flow information aggregation and a second processing stage performing per-destination system component information aggregation, with each processing stage implementing a threshold-based data export scheme and a timer-based data export scheme. In this manner, up-to-date flow information is available to peer system components regardless of the varying flow rates of the network flows.

In the present description, a network flow or "a flow" refers to an Internet Protocol (IP) flow which includes a sequence of data packets communicating information between a source and a destination in one direction. IP flows can include TCP/IP flows and can also include other Layer 4 protocol (or transport protocol), such as UDP. Furthermore, IP flows can include Internet Protocol version 4 (IPv4) or Internet Protocol version 6 (IPv6). Alternately, IP flows can include Multiprotocol Label Switching (MPLS) flows. In the present description, TCP/IP refers to the Internet protocol suite including the set of communications protocols used for the Internet and data networks. The Internet protocol suite includes IP (Internet Protocol), TCP (Transmission Control Protocol), UDP (User Datagram Protocol) or other protocols. A flow identifier (or "Flow ID") for a data packet is determined from information in the header of the data packet. In some embodiment, the flow identifier for a data packet is determined from information in the header of the data packet as well as associated environmental information, such as the incoming physical port of the security device receiving the data packet. The flow identifier is a unique value used to identify a flow in the network security device 102. In some embodiments, the flow identifier is determined from the 5-tuple information of the data packet, including the source IP address, destination IP address, the source port number, the destination port number and the protocol in use. In another embodiment, the flow identifier is determined from the 6 or more tuple information of the data packet which, in addition to the 5-tuple information, includes the interface being used or the incoming physical port. Furthermore, in the present description, two-way connections between a pair of network devices (e.g., client-server) are referred to as a session where a session is composed of two flows representing data traffic in both directions—that is, the forward direction (client to server) and the reverse direction (server to client).

FIG. 1 illustrates an embodiment of an environment in which security policies are enforced. In the example shown, clients 104 and 106 are a laptop computer and desktop computer, respectively, present in an enterprise network 108. A network security device 102 (also referred to herein as a "network device" or a "security device") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or another consumption constraint. Other types of policies can also be enforced, such as ones governing traffic shaping, quality of service, or routing with respect to URL information. In some embodiments, network security device 102 is also configured to enforce policies with respect to traffic that stays within enterprise network 108.

In some embodiments, the network security device 102 includes a security appliance, a security gateway, a security server, a firewall, and/or some other security device, which, for example, can be implemented using computing hardware, software, or various combinations thereof. The functionality provided by network security device 102 can be implemented in a variety of ways. Specifically, network security device 102 can be a dedicated device or set of devices. The functionality provided by device 102 can also be integrated into or executed as software on a general purpose computer, a computer server, a gateway, and/or a network/routing device. Further, whenever device 102 is described as performing a task, a single component, a subset of components, or all components of device 102 may cooperate to perform the task. Similarly, whenever a component of device 102 is described as performing a task, a subcomponent may perform the task and/or the component may perform the task in conjunction with other components. In various embodiments, portions of device 102 are provided by one or more third parties. Depending on factors such as the amount of computing resources available to device 102, various logical components and/or features of device 102 may be omitted and the techniques described herein adapted accordingly. Similarly, additional logical components/features can be added to system 102 as applicable.

Figure 2:
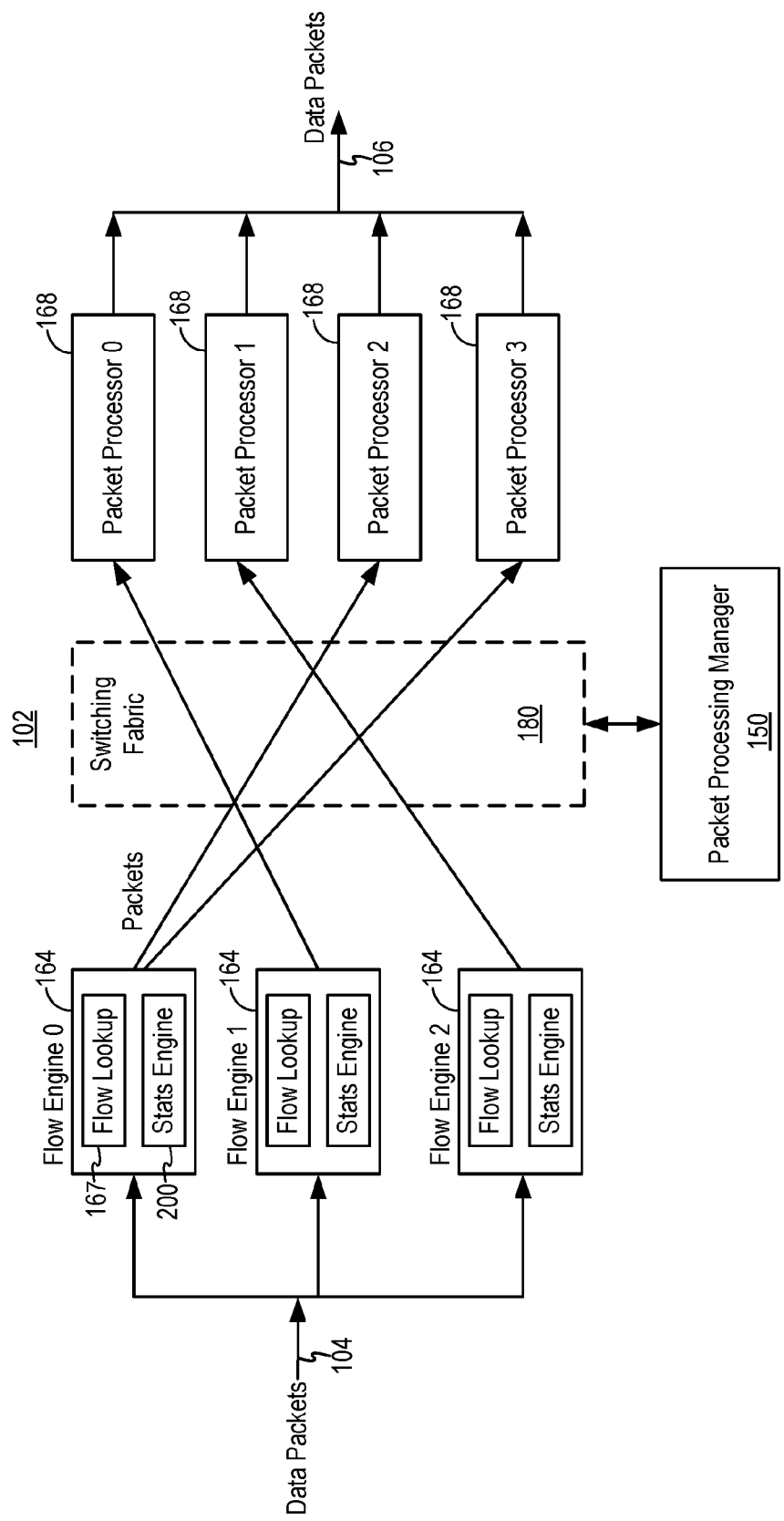
FIG. 2 is a functional diagram of a network security device in embodiments of the present invention.

FIG. 2 is a functional diagram of a network security device in embodiments of the present invention. In the example shown, the functionality of network security device 102 is implemented in a firewall. Referring to FIG. 2, network security device 102 is implemented as a distributed system including multiple independent computing resources. More specifically, network security device 102 includes multiple packet processing cards connected to a switching fabric 180. The packet processing cards may be configured to include a flow engine 164 for processing and identifying network flows associated with the received data packets. The packet processing cards may further be configured to include a packet processor 168 for processing data packets. A packet processing manager 150 manages the packet traffic flow and other operational functions of the flow engines and the packet processors, such as flow ownership assignment.

Figure 3:
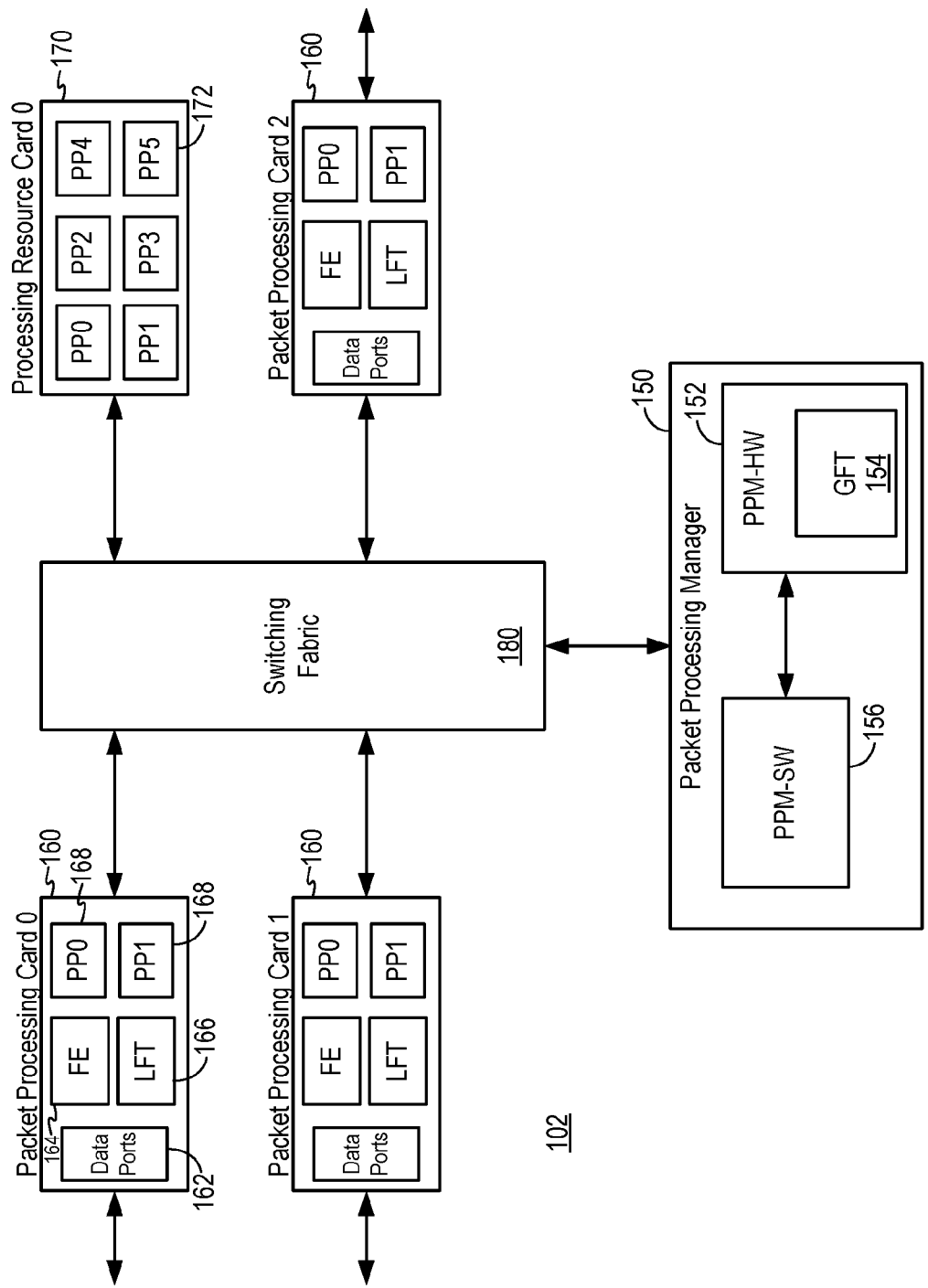
FIG. 3, which duplicates FIG. 2 of copending and commonly assigned U.S. patent application Ser. No. 13/840,691 (691 patent application), is a schematic diagram of a security device which can be used to implement the network security device of FIG. 2 in embodiments of the present invention.

The functional diagram of FIG. 2 is presented primarily to illustrate the operation of network security device 102 with respect to maintaining network flow statistics. FIG. 2 therefore provides a simplified view of the packet processing cards of the network security device 102 and illustrates only part of the components that may be present on any particular packet processing cards. FIG. 2 is not intended to illustrate the actual construction of the network security device 102. Network security device 102 may include other components not shown in FIG. 2 to implement the complete functionalities of the network security device, such as policy enforcement. FIG. 3, which duplicates FIG. 2 of copending and commonly assigned U.S. patent application Ser. No. 13/840,691 (691 patent application), is a schematic diagram of a security device implementing a distributed system using multiple packet processing cards which can be used to implement the network security device 102 in embodiments of the present invention. The construction and operation of the security device in FIG. 3 is described in detail in the 691 patent application and will not be further described here. The 691 patent application is incorporated herein by reference in its entirety.

Returning to FIG. 2, network security device 102 receives incoming data packets on an input port 104 where the incoming data packets Packet_In are distributed to any one of several flow engines 164, such as Flow Engine 0 to Flow Engine 2. After the packet processors 168 process the data packets for security policy enforcement, network security device 102 forwards outgoing data packets on an output port 106. Flow engines 164 and packet processors 168 communicate with each other through the switching fabric 180 to forward incoming data packets from the flow engines 164 to respective packet processors 168.

In embodiments of the present invention, network security device 102 realizes a distributed processing system architecture where flow handling and packet processing are distributed to independent processing resources across the system. That is, processing of incoming data packets are distributed to different packet processors 168. In a distributed processing system, data packets belonging to the same flow or to the same session may arrive at different flow engines 164. A flow engine, receiving an incoming data packet, determines which packet processor 168 among the many packet processors in security device 102 has been assigned ownership of the network flow associated with the incoming data packet and forwards the data packet to the owner packet processor for processing. In embodiments of the present invention, the packet processing manager 150 manages network flow in the network security device 102 and session ownership assignment and provides tracking of flow ownership in the network security device. Under the management of packet processing manager 150, each flow engine 164 receives an incoming data packet and performs flow lookup to determine the network flow to which the incoming data packet belongs. For example, the flow engines 168 may include a flow lookup engine 167 to perform flow classification and flow lookup operations. The flow engine 164 further determines which packet processor 168 among all of the packet processors (e.g. Packet Processors 0 to 3) is the owner packet processor of that network flow. The flow engine 164 then forwards the data packet through the switching fabric 180 to the owner packet processor for processing. The owner packet processor receives the data packet and applies the appropriate security policy.

In the distributed processing system configuration of the network security device 102, data packets belonging to various network flows arrive in real-time at any of the flow engines 164 and network flow information associated with each network flow needs to be collected in real-time. For instance, network flow information (or "flow information") may include the flow identifier (Flow ID) of a network flow and the packet count and the byte count of the network flow. In order to meet the efficiency demand for data collection, each flow engine 164 implements local collection of network flow information. The locally collected flow information is reported periodically to the owner packet processor for that network flow. For instance, the flow engines 164 send messages through the switching fabric 108 to report locally collected network flow information to the owner packet processor. The owner packet processor 168 is the centralized data storage for flow information associated with each network flow its owns. The owner packet processor 168 aggregates all of the partial flow information reported to it by the flow engines. Accordingly, the complete flow information for each network flow being handled by the network security device is available from the owner packet processor. The flow information maintained by the owner packet processors may be queried or requested by peer system components within the network security device or by external systems, which may include hardware or software systems.

However, in practice, network flows often have widely varying rates. That is, data packets for one flow may arrive at the network security device at a very different packet rate than data packets for another flow. Thus, at a given time period, one network flow may only have a few data packets arriving at the network security device ("a slow network flow") while another network flow may have a large number of data packets arriving ("a fast network flow"). The varying rates of network flows render the reporting of locally collected network flow information difficult. In most cases, the flow engines are configured to report the locally collected network flow information at a fixed periodic interval. When the fixed periodic interval is made too short, the system resources of the network security device may be overwhelmed by too many reporting messages. When the fixed periodic interval is made too long, the network information may not be reported frequently enough so that the cumulative flow information maintained by the owner packet processor may become stale. When requests for flow information are made to an owner packet processor, the owner packet processor may not have the most up-to-date flow information for a particular network flow.

In embodiments of the present invention, a network security device includes a network flow statistics processing engine ("stats engine") to process network flow information related to network flows. More specifically, the network flow statistics processing engine includes two cascaded processing stages with each processing stage including a threshold-based data export scheme and a timer-based data export scheme. The first processing stage performs per-flow information aggregation and the second processing stage performs per-destination system component information aggregation. In this manner, efficient and timely reporting of flow information is ensured when the network flows handled by the network security device have a varying mix of fast and slow flows. With each processing stage aggregating flow information at a different granularity, that is, per flow or per destination, and each processing stage implementing threshold based and timer based export schemes, the frequency of the information reporting messages can be well regulated to enable scalability and the use of the distributed processing system in the network security device. In particular, the stats engine ensures that flow information that is collected in real time is provided to the owner packet processor in a controlled manner so that the owner packet processor has current and relevant flow information for the network flows it is maintaining.

In some embodiments, the network flow statistics processing engine is formed as part of the flow engine 164, as shown in FIG. 2. In other embodiments, the network flow statistics processing engine is formed as a companion to the flow engine. The exact construction and level of integration of the flow engine and the stats engine is not critical to the practice of the present invention. It is only necessary that each flow engine 164 is associated with a stats engine 200 to process the network flow information associated with data packets arriving at the flow engine. In some embodiments, the network flow statistics processing engine is implemented as an integrated circuit, for example, as an FPGA or an ASIC.

Figure 4:
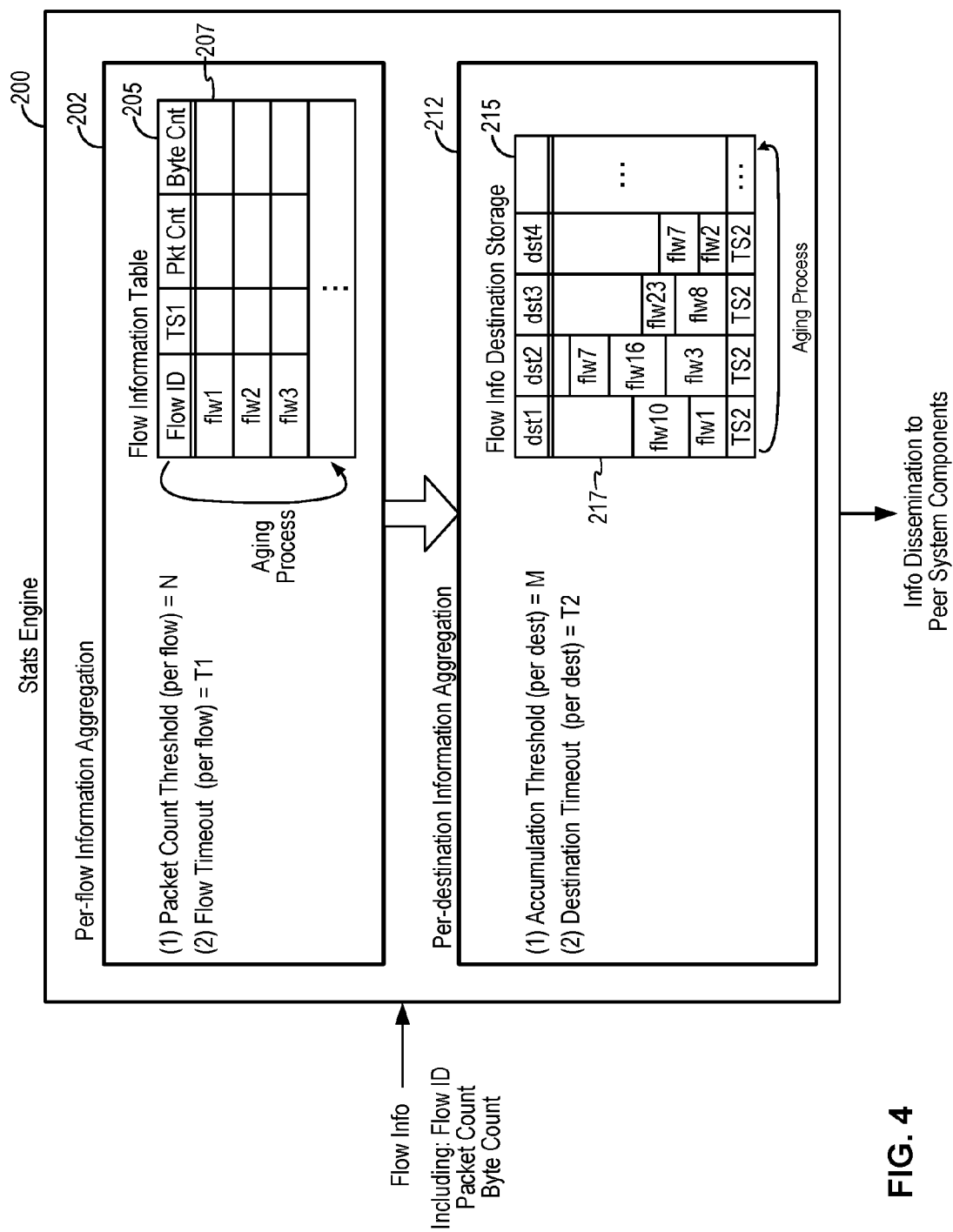
FIG. 4 is a functional diagram of a network flow statistics processing engine in embodiments of the present invention.

FIG. 4 is a functional diagram of a network flow statistics processing engine in embodiments of the present invention. As described above, the network flow statistics processing engine may be incorporated in a flow engine or configured in companion to a flow engine to collect and process network flow information for data packets being received by the flow engine. Referring to FIG. 4, a network flow statistics processing engine ("stats engine") 200 receives network flow information (Flow_Info) generated or gathered by the associated flow engine for each data packet received by the flow engine. For instance, the network flow information may include the flow identifier (Flow ID), the packet count and the byte count of the data packets being received at the associated flow engine. The stats engine 200 stores network flow information for each flow handled by the flow engine. The stats engine 200 disseminates collected network flow information to peer system components based on a two-stage cascaded aggregation scheme with threshold-based and timer-based data export criteria.

More specifically, stats engine 200 is implemented using two processing stages. The first processing stage 202 is a per-flow information aggregation stage where network flow information is collected and aggregated for each network flow. The second processing stage 212 is a per-destination system component information aggregation stage where network flow information is collected and aggregated for each system component destination.

As thus configured, the first processing stage 202 aggregates network flow information for each network flow being handled by the flow engine associated with the stats engine. Per-flow statistics are collected and stored on a per-flow basis. That is, statistics are gathered and organized based on network flows and stored for each network flow. In embodiments of the present invention, each network flow handled by the stats engine 200 is identified by a flow identifier (Flow ID) and flow information being aggregated for each network flow includes a timestamp (TS1), the total packet count and the total byte count of data packets that have been received for that network flow. In some embodiments, the per-flow information is stored in a table 205, also referred to as the flow information table 205. Table 205 may be implemented as a memory, such as a random access memory. In the example embodiment of FIG. 4, flow information table 205 includes table entries 207 for storing network information associated with each network flow as identified by the Flow ID flw#. The first processing stage 202 sums the packet count and the byte count for each network flow flw# and maintains the timestamp TS1 of the received data packet. The first processing stage 202 operates continuously to aggregate per-flow information from the incoming data packets and stores the information in table 205.

In some embodiments, when the flow engine identifies a new network flow and the new network flow is added to the flow information table 205, the time that network flow is added is stored as the initial timestamp value TS1 for that network flow. Subsequently, the timestamp TS1 for each network flow in the flow information table 205 is updated each time the stored network flow information associated with a network flow is exported to the second processing stage. Accordingly, the timestamp TS1 may be the time of the oldest data packet was received for a network flow or the time the last export of stored network information for a network flow was made.

In stats engine 200, the first processing stage 202 exports the collected flow information to the second processing stage 212 based on a flow information threshold limit and a timer limit. In some embodiments, the flow information threshold limit assesses a given flow information data collected for each network flow and establishes a limit value for the flow information data at which the locally collected flow information should be exported to the owner packet processor. In one embodiment, the flow information threshold limit is a packet count threshold limit which measures the number of data packets received for the network flow. When the packet count of a network flow reaches the packet count threshold limit, the locally collected flow information should be exported to the owner packet processor. In another embodiment, the flow information threshold limit is a byte count threshold limit which measures the number of bytes of data received for the network flow. When the byte count of a network flow reaches the byte count threshold limit, the locally collected flow information should be exported to the owner packet processor. In other embodiments, other network flow information may be used to establish a threshold limit for the purpose of determining when sufficient locally collected network flow information has been collected and should be exported to the owner packet processor. In the present description, the flow information threshold limit is configured as a packet count threshold limit. The use of a packet count threshold limit as the flow information threshold limit is illustrative only and is not intended to be limiting.

In the present embodiment, the first processing stage 202 maintains a packet count threshold N per network flow as the flow information threshold limit and a flow timeout T1 per network flow as the timer limit. The packet count threshold N and the flow timeout T1 can be programmable by peer system components or system components external to the network security device. For example, the packet count threshold N and the flow timeout T1 can be programmable by a network administrator. In one example, the packet count threshold N is 10 and the flow timeout is 10 μs.

Furthermore, in some embodiments, the same flow information threshold limit or the same flow timeout value is applied to all network flows maintained by the stats engine. In other embodiments, each network flow or a group of network flows may be configured with individual flow information threshold limits or individual flow timeout values. Accordingly, each network flow or a group of network flows may be assigned different flow information threshold limits or flow timeout values.

In operation, the first processing stage 202 monitors the packet count of the network flows stored in the table 205. When the packet count of a particular network flow flw# exceeds the packet count threshold N, the first processing stage 202 exports the flow information collected for that network flow to the second processing stage 212. In particular, the first processing stage 202 exports the flow information to a per-destination storage in the second processing stage 212, as will be explained in more detail below. Meanwhile, the first processing stage 202 also performs an aging process based on the flow timeout T1. In some embodiments, the aging process is a background process that is continuously running. With the aging process running, the first processing stage 202 checks the timestamp TS1 for each network flow to determine if any network flow has an elapsed time that exceeds the flow timeout T1. In the present embodiment, the elapsed time of a network flow is the time duration from the timestamp TS1 associated with a network flow to the current time. For example, the elapsed time can be measured as the difference between the current time and the stored timestamp value TS1 for the network flow, that is, elapsed time=current time−timestamp TS1. In other embodiments, other methods to measure the elapsed time may be used or other methods to assess when the flow timeout has been exceeded can be used. The elapsed time of a network flow exceeds the flow timeout T1 to indicate that the time since the oldest data packet was received is too long or the time since the last data export is too long. When a network flow flw# has an elapsed time that exceeds the flow timeout T1 (for example, the elapsed time can be measured as the difference between the current time and the timestamp TS1), the first processing stage 202 exports the flow information collected for that network flow to the second processing stage 212.

Accordingly, when the data packets for a network flow are arriving at a fast rate, the first processing stage stores the flow information in table 205 and the packet count for the fast network flow will hit the packet count threshold N very quickly and the flow information for the fast network flow will be exported to the second processing stage frequently. On the other hand, when the data packets for a network flow are arriving at a slow rate, the first processing stage stores the flow information in table 205 and the packet count for the slow network flow may remain below the packet count threshold for a long time. In that case, the background aging process examines the timestamps of the network flows in table 205. When the elapsed time of the slow network flow exceeds the flow timeout T1, the flow information for the slow network flow will be exported to the second processing stage. In this manner, the flow information for slow network flows will be exported at predetermined time intervals and not being left in table 205 for extended period of time.

In embodiments of the present invention, the first processing stage is configured to export stored flow information for a network flow when the network flow is being deleted. A network flow may be deleted from the stats engine in response to an instruction from the packet processing manager or in response to the network flow being idle for too long.

The second processing stage 212 receives network flow information exported from the first processing stage 202 and aggregates network flow information on a per-destination basis. In the present description, "destination" refers to a peer system component in the network security device 102, which may be hardware or software, which requests or subscribes to network flow information associated with one or more network flows. For example, one type of destinations in the network security device may be the packet processors. Each packet processor may subscribe to flow information of the network flows to which it has assigned ownership. In other examples, the destination may be system components performing management functions and requiring network information for one or more network flows.

In embodiments of the present invention, the second processing stage 212 includes a per-destination storage to handle K number of destinations, such as 128 destinations. The per-destination storage stores and organizes network flow information received from the first processing stage for each destination. Each destination may subscribe to one or more network flows. That is, each destination may request network flow information for one or more network flows. For example, a destination dst1 may subscribe to network flows flw1 and flow10 while a destination dst2 may subscribe to network flows 3, 7 and 16. In the present embodiment, the second processing stage 212 implements a queue-based data aggregation scheme where a queue 215, also referred to as a "destination queue," is assigned to each destination to store flow information associated with the network flows to which a destination subscribes. Each queue 215 for each destination also stores a timestamp TS2 for that queue. The second processing stage 212 thus includes K number of queues 215 to accumulate flow information for the K number of destinations. In other words, each queue 215 stores per-destination flow information and is also referred to as the flow info destination queue 215. In some embodiments, the queues 215 are implemented as a FIFO (first-in-first-out) memory. In other embodiments, other memory storage structure may be used to store the per-destination network flow information and the use of a queue-based storage mechanism is illustrative only. As thus configured, the second processing stage 212 operates continuously to aggregate per-destination network flow information from the first processing stage 202.

In operation, as the first processing stage 202 exports per-flow flow information (that is flow information for each flow) to the second processing stage 212, the second processing stage 212 distributes per-flow flow information to the destination queue 215 that subscribes to the particular network flow. For example, flow information for flow flw1 is distributed to destination dst1 only while flow information for flow flw7 is distributed to destination dst2 and dst4. The second processing stage 212 bundles or accumulates the network flow information for each destination and disseminates the accumulated network flow information to the destination peer system components.

In some embodiments, when network flow information is exported form the first processing stage to a given destination for the first time, that time is used as the initial timestamp TS2 for that destination. In other words, the time that exported network flow information is stored in a destination queue that was previously empty is used as the initial timestamp TS2. Subsequently, the timestamp TS2 for each destination queue is updated each time the accumulated network flow information for the destination queue is exported to the associated destination. Accordingly, the timestamp TS2 may be the time of the oldest flow information stored in the destination queue or the time the last export of the accumulated network information for a given destination was made.

In stats engine 200, the second processing stage 212 exports the accumulated network flow information to destination peer system components based on an accumulation threshold limit M and a timer limit T2. The accumulation threshold limit M assesses the amount of data that has been accumulated in each destination queue. The accumulation threshold limit M indicates when a sufficient amount of data has been accumulated for a destination in the destination queue such that the accumulated flow information should be exported to the destination peer system component. In some embodiments, the accumulation threshold limit is configured to measure the queue depth of each destination queue to assess the amount of data being accumulated.

In embodiments of the present invention, the accumulation threshold M and the destination timeout T2 can be programmable by peer system components or system components external to the network security device. For example, the accumulation threshold M and the destination timeout T2 can be programmable by a network administrator. In one example, the accumulation threshold M is 25 and the destination timeout is 0.5 ms.

In some embodiments, the second processing stage 212 maintains the same accumulation threshold M or the same destination timeout T2 for all the destination queues. In other embodiments, the second processing stage 212 can be configured to maintain an accumulation threshold M for each destination queue or for a group of destination queues. The second processing stage 212 may further be configured to maintain a destination timeout T2 for each destination queue or for a group of destination queues. Accordingly, each destination queue or a group of destination queues may have different accumulation threshold limits or destination timeout values.

In operation, the second processing stage 212 monitors the amount of accumulated flow information at each destination queue 215. In the present embodiment, the amount of accumulated flow information is measured as the queue depth of each destination queue. When the queue depth of a particular destination dst# exceeds the accumulation threshold M, the second processing stage 212 exports the accumulated flow information in the queue to the associated destination system component. Meanwhile, the second processing stage 212 also performs an aging process based on the destination timeout T2. In some embodiments, the aging process is a background process that is continuously running. With the aging process running, the second processing stage 212 checks the timestamp TS2 of each destination queue to determine if any destination queue has an elapsed time exceeding the destination timeout T2. In the present embodiment, the elapsed time of a destination queue is the time duration from the timestamp TS2 associated with a destination queue to the current time. For example, the elapsed time can be measured as the difference between the current time and the stored timestamp value TS2 for the destination queue, that is, elapsed time=current time−timestamp TS2. In other embodiments, other methods to measure the elapsed time may be used or other methods to assess when the destination timeout has been exceeded can be used. When a destination queue dst# has an elapsed time that exceeds the destination timeout T2, the second processing stage 212 exports the accumulated flow information collected for that destination to the associated destination system component.

In the second processing stage 212, when the queue depth for a given destination queue reaches the accumulation threshold M or when the elapsed time exceeds the destination timeout T2, the content of the destination queue is exported out to the associated destination system component. In some embodiments, the content of the destination queue is flushed or M entries of the destination queue are read-out of the storage. Accordingly, when the data packets for a network flow are arriving at a fast rate, the first processing stage 202 will export flow information to the second processing stage 212 at a fast rate and the subscribing destination queue 215 will become filled up and will hit the accumulation threshold M very quickly. The flow information for the fast network flow will then be exported to the destination system component frequently. On the other hand, when the data packets for a network flow are arriving at a slow rate, the first processing stage 202 sends out flow information for the slow network flow only periodically. The flow information in each destination queue in the second processing stage 212 will be accumulating at a slow rate and may remain below the accumulation threshold for a long time. In that case, the background aging process examines the timestamps of the flow information in the destination queues 215. When the elapsed time of the flow information exceeds the destination timeout T2, the flow information for the slow network flow accumulated in the destination queue will be exported to the destination system component. In this manner, the flow information for slow network flows will be exported at predetermined time intervals and not being left in the destination queue 215 for extended period of time.

In embodiments of the present invention, the accumulation threshold M and the destination timeout T2 can be the same for all destination queues or programmable for each destination or each queue so that each destination system component can have the same or different thresholds and timeout values. Each destination system component can thus set the rate at which it wants to receive network flow information from the stats engine 200 by setting the accumulation threshold M and the destination timeout T2 to desired values. For example, a system component may want to set the accumulation threshold M high so as not to be overwhelmed by a network flow with a fast packet rate. Alternately, a system component may want to set the accumulation threshold M low to ensure it receives most current network flow information.

In the embodiment shown in FIG. 4, the flow information table 205 and the flow information destination queue 215 of the stats engine 200 are implemented using memory devices that are integrated with the stats engine. In other embodiments, the flow information table 205 and the flow information destination queue 215 of the stats engine 200 are implemented using external memory devices being memory devices that are external to the integrated circuit of the stats engine 200. In yet other embodiments, either the flow information table 205 or the flow information destination queue 215 may be integrated with the stats engine with the other one being implemented using an external memory device.

Figure 5:
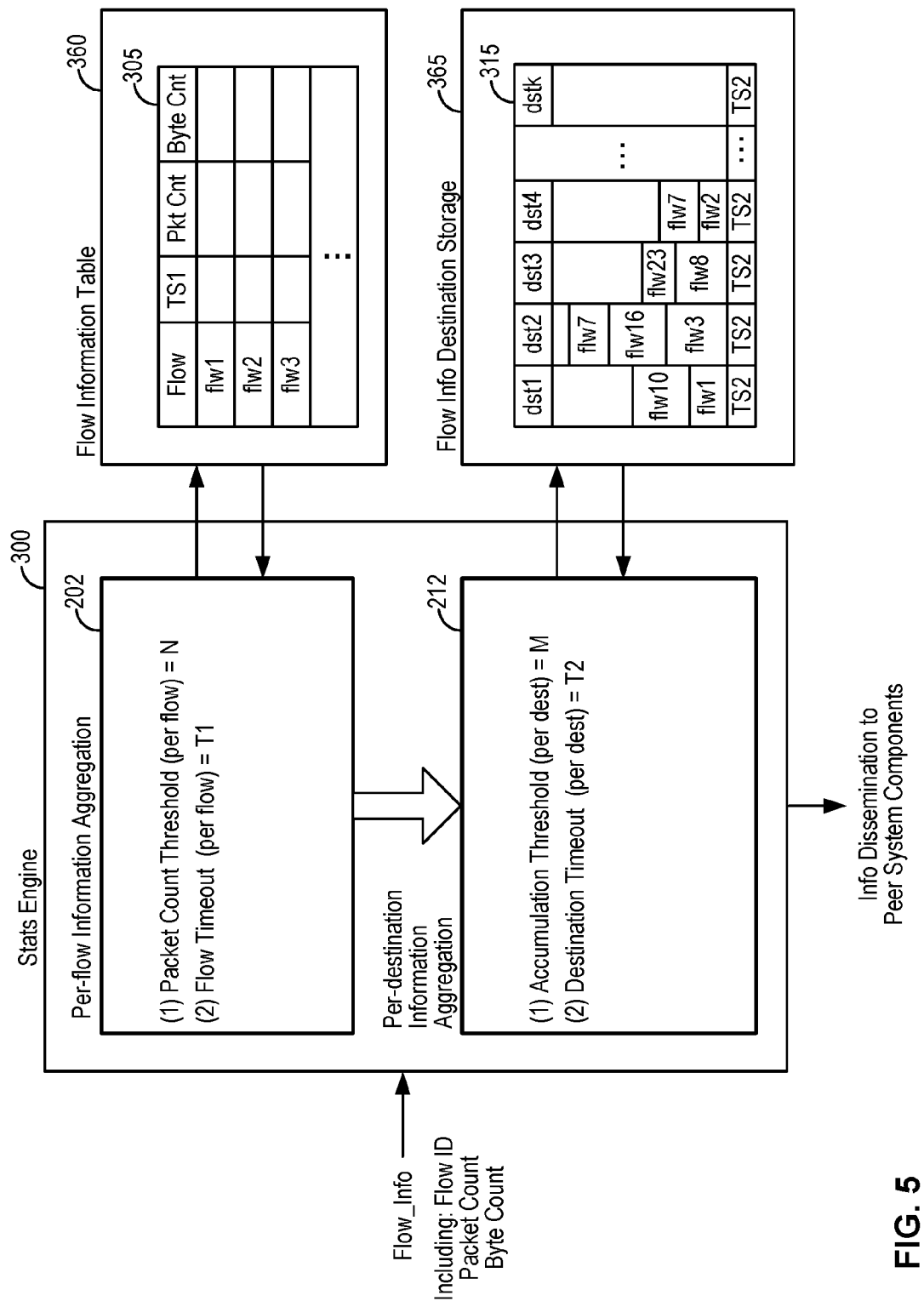
FIG. 5 is a functional diagram of a network flow statistics processing engine in alternate embodiments of the present invention.

FIG. 5 is a functional diagram of a network flow statistics processing engine in alternate embodiments of the present invention. Referring to FIG. 5, the network flow statistics processing engine 300 ("stats engine 300") is implemented in the same manner as described with reference to stats engine 200 of FIG. 4 except that the flow information table 305 and the flow information destination queue 315 are implemented using memory devices 360, 365 external to the stats engine 300. The first processing stage 202 communicates with the external memory device 360 to store and retrieve data stored in the flow information table 305. The second processing stage 212 communicates with the external memory device 365 to store and retrieve data stored in the flow information destination queue 315. Using external memory devices 360, 365 may provide implementation advantages over using integrated memory devices.

In the above described embodiments, the network flow statistics processing engine is applied in a network security device for processing flow statistics associated with network flows. In other embodiments, the network flow statistics processing engine can be applied in other distributed systems to collect per-item based data for dissemination to a large number of destinations, especially when the per-item based data has varying data rate. In the present description, per-item based data can be per-flow data associated with network flows, per-event data associated with system events in a network security device or other data objects in a distributed processing system. The statistics processing engine of the present invention can be applied to process any per-item based data to regulate the flow of the data through the distributed system.

Figure 6:
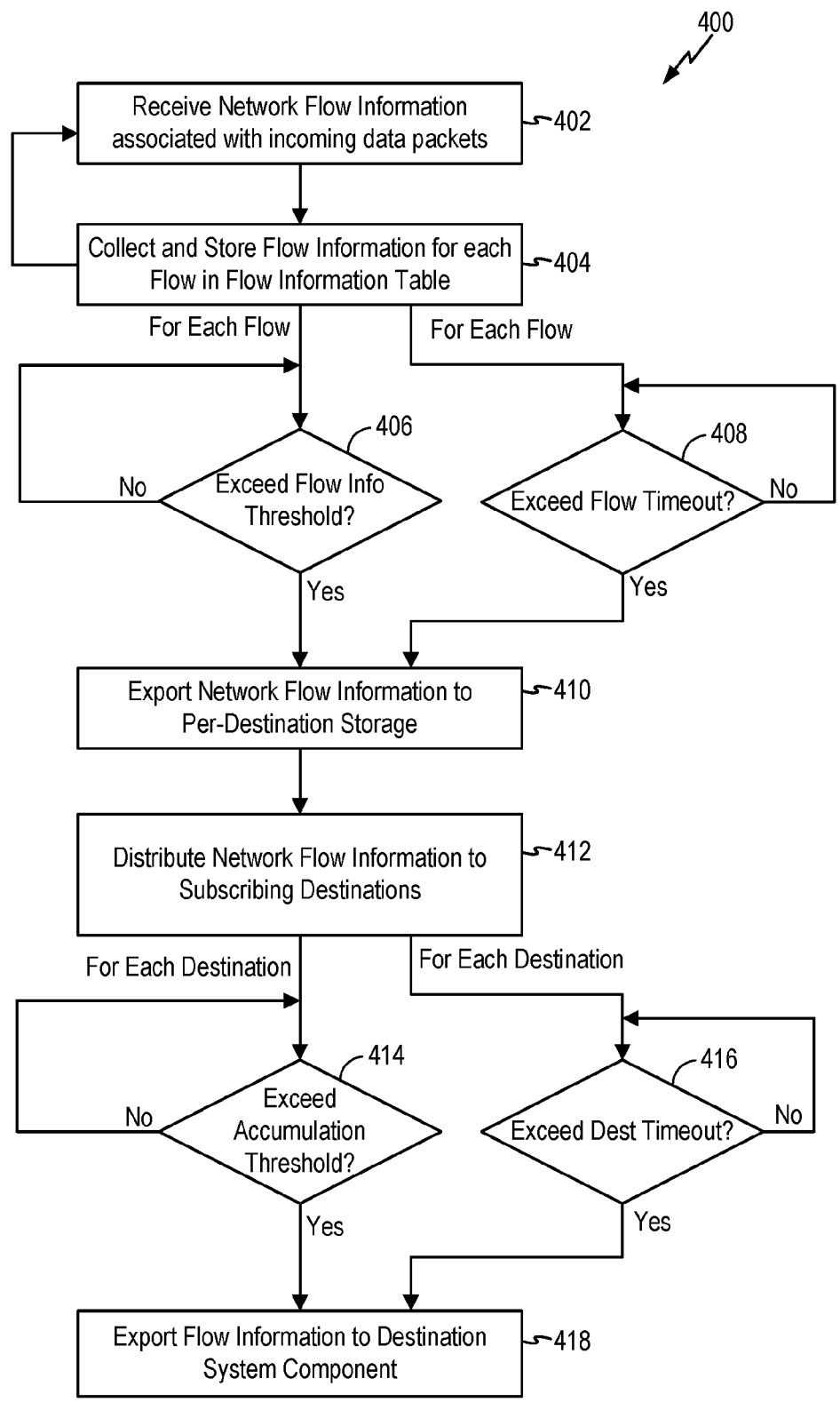
FIG. 6 is a flow chart illustrating the network flow statistics processing method according to embodiments of the present invention.

FIG. 6 is a flow chart illustrating the network flow statistics processing method according to embodiments of the present invention. The network flow statistics processing method may be implemented in the flow engine of the network security device of FIG. 2 in embodiments of the present invention. Referring to FIG. 6, the network flow statistics processing method 400 receives network flow information associated with incoming data packets (402). The network flow information may be gathered by the flow engine and may include the flow identifier, the packet count and the byte count of the incoming data packets. The method 400 collects and stores network flow information for each network flow on a per-flow basis in a flow information table (404). For example, the flow information table may be implemented using a memory device. The method 400 continues to receive network flow information (402) and stores the information on a per-flow basis in the flow information table (404).

As the network flow information is being received and stored, the method 400 assesses a given flow information data for each network flow to determine if any network flow has stored flow information data that exceeds a flow information threshold limit (406). For example, the flow information data can be the packet count or the byte count of the network flow. If no stored flow information data exceeds the flow information threshold limit, the method 400 continues to monitor the stored flow information of the network flows in the flow information table (406). When the stored flow information data of a network flow exceeds the flow information threshold, the method 400 exports the per-flow network flow information for that network flow to a per-destination storage (410). In particular, the exported flow information is distributed to one or more destinations in the per-destination storage that subscribe to the network flow (412). For example, the per-destination storage may be implemented using a FIFO memory device.

Meanwhile, the method 400 performs a background aging process on the stored data in the flow information table. More specifically, the method 400 assesses the timestamp for each network flow to determine if any network flow has an elapsed time exceeding the flow timeout (408), where the elapsed time is the time from the timestamp to the current time. If no elapsed time exceeds the flow timeout, the method 400 continues to monitor the timestamps and the elapsed times of the network flows in the flow information table (408). In the event that the flow timeout has been exceeded by a given network flow, the method 400 proceeds to export the per-flow network flow information for that network flow to a per-destination storage (410). In one embodiment, the per-destination storage may be a set of memory queues, also referred to as "destination queues," where one memory queue is assigned to each destination. The exported flow information is distributed to one or more destinations in the per-destination storage that subscribe to the network flow (412).

As network flow information is being distributed to and stored in the destination storage, the method 400 assesses the amount of accumulated flow information for each destination to determine if the amount of accumulated flow information for any destination has exceeded an accumulation threshold (414). If no destination exceeds the accumulation threshold, the method 400 continues to monitor the amount of accumulated flow information for each destination (414). When the amount of accumulated flow information for a destination exceeds the accumulation threshold, the method 400 exports the per-destination flow information to the destination system component (418).

Meanwhile, method 400 performs a background aging process on the stored data in the per-destination storage. More specifically, the method 400 assesses the timestamp for each destination to determine if any destination has an elapsed time exceeding the destination timeout (416), where the elapsed time is the time from the timestamp to the current time. If no elapsed time exceeds the destination timeout, the method 400 continues to monitor the timestamps and elapsed times of the per-destination storage (416). In the event that the destination timeout has been exceeded by a given destination, the method 400 proceeds to export the accumulated flow information for that destination to the destination system component (418). In this manner, the method 400 regulates the collection and distribution of network flow information to destination system components in a network security device. Method 400 ensures efficient and timely dissemination of flow statistics even when the network flows have widely varying rates.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network security device for processing a plurality of network flows, the network security device comprising:
    a flow engine implemented in a hardware processor of the network security device and configured to receive incoming data packets associated with one or more network flows, the flow engine being configured to process and identify network flows associated with the received data packets and, based on the identified network flows, to forward the received data packets to respective packet processors for processing and to separately forward network flow information for statistics processing;
    a network flow statistics processing engine implemented in the hardware processor of the network security device and configured to process the network flow information received from the flow engine and related to the network flows being handled by the flow engine, the network flow information comprising at least a flow identifier and count information of the received data packets for each network flow, the network flow statistics processing engine comprising:
        a first processing stage configured to store and aggregate network flow information for each network flow handled by the flow engine on a per-flow basis, the first processing stage exporting the stored network flow information associated with a given network flow in response to a network flow information data for that network flow exceeding a flow information threshold or a first elapsed time for that network flow exceeding a flow timeout, the first elapsed time being a time duration from a first timestamp associated with that network flow and a current time; and
        a second processing stage configured to receive the exported network flow information from the first processing stage, the second processing stage being configured to store the received network flow information on a per-destination basis into a per-destination storage, each destination being associated with a peer system component in the network security device and subscribing to the network flow information of one or more network flows, the second processing stage exporting the stored network flow information to a destination system component associated with a given destination in response to the destination having accumulated network flow information exceeding an accumulation threshold or a second elapsed time for that destination exceeding a destination timeout, the second elapsed time being a time duration from a second timestamp associated with that destination and a current time;
        wherein the network flow statistics processing engine provides the network flow information to the subscribing destination system component of the network security device, the network flow information being used by the destination system component to perform management functions or to enforce security policy on the incoming data packets at the respective packet processors.

2. The network security device of claim 1, wherein the first processing stage comprises a flow information table configured to store network flow information on a per-flow basis for each network flow being handled by the flow engine, the flow information table comprising a plurality of table entries, each table entry configured to store network flow information for one network flow.

3. The network security device of claim 1, wherein the network flow information comprises a flow identifier, a packet count, and a byte count of the received data packets for each network flow.

4. The network security device of claim 1, wherein the second processing stage comprises the per-destination storage configured to store network flow information exported by the first processing stage on the per-destination basis, each destination being configured to subscribe to one or more network flows and to receive network flow information for the one or more network flows to which the destination has subscribed.

5. The network security device of claim 4, wherein the per-destination storage comprises a plurality of memory queues, each memory queue configured to store network flow information for one destination, each destination receiving network flow information associated with one or more subscribing network flows.

6. The network security device of claim 5, wherein the per-destination storage comprises a first-in-first-out (FIFO) memory.

7. The network security device of claim 6, wherein the per-destination storage is implemented as a first-in-first-out (FIFO) memory device external to and in communication with the network flow statistics processing engine.

8. The network security device of claim 1, wherein the network flow information data comprises a packet count of the network flow and the flow information threshold comprises a packet count threshold, the first processing stage being configured to export the stored network flow information associated with a given network flow in response to the packet count for that network flow exceeding the packet count threshold.

9. The network security device of claim 1, wherein the flow information threshold, the flow timeout, the accumulation threshold, and the destination timeout are programmable values.

10. The network security device of claim 1, wherein the flow information threshold, the flow timeout, the accumulation threshold, and the destination timeout are selected based on the rate of the network flows being received by the flow engine.

11. The network security device of claim 1, wherein the first processing stage is configured to assign a first flow information threshold to a first network flow and a second flow information threshold to a second network flow, the first flow information threshold different from the second flow information threshold.

12. The network security device of claim 1, wherein the first processing stage is configured to assign a first flow timeout to a first network flow and a second flow timeout to a second network flow, the first flow timeout different from the second flow timeout.

13. The network security device of claim 1, wherein the second processing stage is configured to assign a first accumulation threshold to a first network flow and a second accumulation threshold to a second network flow, the first accumulation threshold different from the second accumulation threshold.

14. The network security device of claim 1, wherein the second processing stage is configured to assign a first destination timeout to a first network flow and a second destination timeout to a second network flow, the first destination timeout different from the second destination timeout.

15. The network security device of claim 1, wherein the first timestamp has an initial time value being the time a network flow is added to the first processing stage and the first timestamp being updated in response to the first processing stage exporting the stored network flow information associated with a given network flow.

16. The network security device of claim 1, wherein the second timestamp has an initial time value being the time the exported network flow information is received for a destination for the first time and the second timestamp is updated in response to the second processing stage exporting the stored network flow information to a destination system component.

17. A method for processing a plurality of network flows in a security device, the method comprising:

receiving incoming data packets at a flow engine of the security device, the security device including a hardware processor;

identifying, using the hardware processor, network flows associated with the received data packets;

based on the identified network flows, forwarding the received data packets to respective packet processors for processing and separately forwarding network flow information for statistics processing;

storing the network flow information received from the flow engine for each network flow in a flow information table, the network flow information comprising at least a flow identifier and count information of the received data packets for each network flow;

accessing, using the hardware processor, a network flow information data for each network flow in the flow information table;

in response to the network flow information data for a network flow exceeding a first threshold, exporting, using the hardware processor, the network flow information for that network flow to a per-destination storage;

in response to a first elapsed time for a network flow exceeding a first timeout, the first elapsed time being a time duration from a first timestamp associated with that network flow and a current time, exporting, using the hardware processor, the network flow information for that network flow to the per-destination storage;

storing the exported network flow information into a per-destination storage, each destination being associated with a peer system component in the network security device and subscribing to the network flow information of one or more network flows;

in response to an accumulated network flow information for a destination exceeding a second threshold, exporting, using the hardware processor, the accumulated network flow information for that destination to an associated destination system component;

in response to a second elapsed time for a destination exceeding a second timeout, the second elapsed time being a time duration from a second timestamp associated with that destination and a current time, exporting, using the hardware processor, the accumulated network flow information for that destination to an associated destination system component; and providing the network flow information to the associated destination system component of the security device, the network flow information being used by the associated destination system component to perform management functions or to enforce security policy on the incoming data packets at the respective packet processors.

18. The method of claim 17, wherein storing network flow information for each network flow in a flow information table comprises storing network flow information for each network flow in a flow information table comprising a plurality of table entries, each table entry configured to store network flow information for one network flow.

19. The method of claim 17, wherein storing network flow information for each network flow in a flow information table comprises storing network flow information comprising a flow identifier, a packet count, and a byte count of the received data packets for each network flow.

20. The method of claim 17, wherein exporting, using the hardware processor, the network flow information for that network flow to the per-destination storage comprises exporting, using the hardware processor, the network flow information for that network flow to the per-destination storage comprising a plurality of memory queues, each memory queue configured to store network flow information for one destination.

21. The method of claim 17, wherein accessing, using the hardware processor, a network flow information data for each network flow in the flow information table comprises accessing, using the hardware processor, a packet count of each network flow in the flow information table; and wherein in response to the packet count for a network flow exceeding a first threshold, exporting the network flow information for that network flow to the per-destination storage.

22. The method of claim 17, wherein the first timestamp has an initial time value being the time a network flow is added to the first processing stage and the first timestamp being updated in response to the first processing stage exporting the stored network flow information associated with a given network flow.

23. The method of claim 17, wherein the second timestamp has an initial time value being the time the exported network flow information is received for a destination for the first time and the second timestamp being updated in response to the second processing stage exporting the stored network flow information to a destination system component.

* * * * *